United States Patent
Akashi et al.

(10) Patent No.: US 12,146,787 B2
(45) Date of Patent: Nov. 19, 2024

(54) OPTICAL CONTROL APPARATUS AND OPTICAL CONTROL METHOD

(71) Applicant: NEC Corporation, Tokyo (JP)

(72) Inventors: Ryuichi Akashi, Tokyo (JP); Ryo Yamakabe, Tokyo (JP); Yuka Ogino, Tokyo (JP); Takahiro Toizumi, Tokyo (JP); Chisato Funayama, Tokyo (JP); Keiichi Chono, Tokyo (JP); Masato Tsukada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 250 days.

(21) Appl. No.: 17/781,775

(22) PCT Filed: Dec. 16, 2019

(86) PCT No.: PCT/JP2019/049226
§ 371 (c)(1),
(2) Date: Jun. 2, 2022

(87) PCT Pub. No.: WO2021/124414
PCT Pub. Date: Jun. 24, 2021

(65) Prior Publication Data
US 2023/0027196 A1    Jan. 26, 2023

(51) Int. Cl.
*G01J 1/02*     (2006.01)
*G01B 11/24*    (2006.01)
*G01J 1/04*     (2006.01)
*G03B 15/02*    (2021.01)
*G06T 7/521*    (2017.01)
*H04N 23/74*    (2023.01)

(52) U.S. Cl.
CPC ............ *G01J 1/0266* (2013.01); *G01B 11/24* (2013.01); *G01J 1/0403* (2013.01); *G01J 1/0411* (2013.01); *G03B 15/02* (2013.01); *G06T 7/521* (2017.01); *H04N 23/74* (2023.01); *G06T 2207/10152* (2013.01)

(58) Field of Classification Search
CPC ...... G01J 1/0266; G01J 1/0403; G01J 1/0411; G03B 15/02; G01B 11/24; H04N 5/2354; G06T 2207/10152
USPC .................................................. 356/601–623
See application file for complete search history.

(56) References Cited

U.S. PATENT DOCUMENTS

| 7,033,030 B2 * | 4/2006 | Sannohe ............. G03B 21/005 359/227 |
| 11,415,661 B2 * | 8/2022 | Eberspach ............ G01S 7/4804 |
| 2019/0293414 A1 * | 9/2019 | Sorimoto .......... G01B 11/2518 |

FOREIGN PATENT DOCUMENTS

| JP | S62-189044 A | 8/1987 |
| JP | 2008-185717 A | 8/2008 |
| JP | 2009-204734 A | 9/2009 |
| JP | 2012-147739 A | 8/2012 |

(Continued)

OTHER PUBLICATIONS

International Search Report for PCT Application No. PCT/JP2019/049226, mailed on Mar. 17, 2020.

*Primary Examiner* — Hoa Q Pham
(74) *Attorney, Agent, or Firm* — Sughrue Mion, PLLC

(57) ABSTRACT

The optical control apparatus includes a light source, a light collecting section, and an optical path control section. The light source emits light. The light collecting section collects the light emitted from the light source and illuminates the light onto an object.

3 Claims, 13 Drawing Sheets

(56) References Cited

FOREIGN PATENT DOCUMENTS

JP          2013097104 A  *  5/2013
JP          2015-108582 A     6/2015

* cited by examiner

OPTICAL CONTROL APPARATUS AND OPTICAL CONTROL METHOD

This application is a National Stage Entry of PCT/JP2019/049226 filed on Dec. 16, 2019, the contents of all of which are incorporated herein by reference, in their entirety.

TECHNICAL FIELD

The present some non-limiting embodiments relate to a technique for illuminate light onto an object.

BACKGROUND ART

A camera may photograph a subject through a transparent or translucent medium such as glass, while applying light onto the subject using illumination. In this case, since a directly reflected light of illumination light off a surface of a transparent object is incident on the camera, not only a reflected light component from the subject but also a component of light reflected off the surface of a transparent object are included in a captured image. In a case where pixel values of the photographed image are saturated by the directly reflected light of the illumination light off the surface of the transparent object which is incident on the camera, a reflectance and a shape of the subject are not correctly observed. Therefore, in order to photograph the subject without the pixel values being saturated by direct reflection off the surface of the transparent object, it is necessary to photograph by using a camera having a wide dynamic range or by changing each relative positional relationship among the illumination, the camera, and the transparent object according to the shape of the transparent object so that the directly reflected light of the illumination light does not enter the camera. However, a camera with a wide dynamic range that does not saturate even with the directly reflected light of the illumination generally do not exist. Accordingly, in order to prevent saturation of a captured image, it is necessary to control an illumination direction of light with respect to the transparent object and the subject.

Patent Document 1 describes a method for changing an angle of an optical axis of illumination light collected on a sample by adjusting a position of an optical axis direction of a diaphragm included in an illumination optical system, in an observation apparatus for illuminating the light onto the sample.

PRECEDING TECHNICAL REFERENCES

Patent Document

Japanese Laid-open Patent Publication No. 2012-147739

SUMMARY

Problem to be Solved

However, since a technique of Patent Document 1 includes a structure in which a diaphragm is moved in an optical axis direction of illumination light, it is necessary to secure an area for moving the diaphragm, and thus, there is a problem that an apparatus becomes large.

It is one object of the present disclosure to provide an optical control apparatus capable of changing an illumination direction of light illuminating onto an object without changing a position of an optical system.

Means for Solving the Problem

According to an example aspect of the present disclosure, there is provided an optical control apparatus including:
a light source configured to emit light;
a light collecting section configured to collect light emitted from the light source and illuminate the light onto an object; and
an optical path control section configured to be arranged between the light source and the light collecting section, and change an illumination direction of the light onto the object by changing a position of a portion through which the light passes in a plane perpendicular to an optical axis of the light.

According to another example aspect, there is provided an optical control method including:
causing a light source to emit light; and
collecting the light and illuminating the light onto an object while changing an illumination direction with respect to the object by changing a position of a portion through which the light passes in a plane perpendicular to an optical axis of the light.

According to still another example aspect, there is provided an optical control apparatus that is arranged between a light source and a light collecting section, and changes an illumination direction of light with respect to an object by changing a position of a portion through where the light passes in a plane perpendicular to an optical axis of the light.

Effect

According to the present disclosure, it is possible to provide an optical control apparatus capable of changing an illumination direction of light illuminating onto an object without changing a position of an optical system.

EXAMPLE EMBODIMENTS

In the following, example embodiments will be described with reference to the accompanying drawings.

First Example Embodiment

Figure 1A:
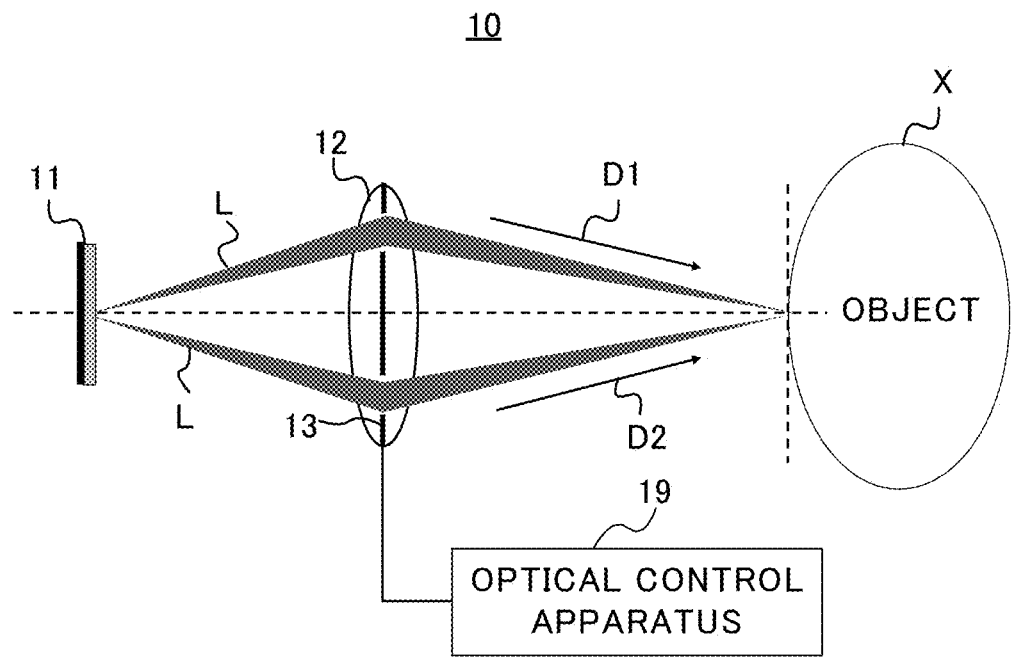
FIG. 1A and FIG. 1B illustrate a configuration of an optical control apparatus according to a first example embodiment.

FIG. 1A illustrates a configuration of an optical control apparatus according to a first example embodiment of the present disclosure. As illustrated, an optical control apparatus 10 includes a light source 11, a light collecting section 12, a light shielding section 13, and an optical path control section 19. The light source 11 emits light toward the light collecting section 12. As the light source 11, any of a point light source, a surface light source, a ring-type light source, and a parallel light source may be used, and is not limited to a particular shape of the light source. In the example in FIG. 1A, the light source 11 emits light L in a direction of the light collecting section 12.

The light collecting section 12 collects the light L illuminated from the light source 11, and illuminates an object X as illumination light. The light collecting section 12 is formed by a lens, and includes an optical path control function using the light shielding section 13. The optical path control function controls an illumination direction of light illuminating onto the object X by blocking a portion of a path of the light L at a time of collecting the light L by the light collecting section 12. Specifically, the optical path control function is realized by the optical path control section 19. For instance, by the processor executes a computer program, the optical path control section 19 drives a motor for controlling a diaphragm of the lens, which is an example of the light shielding section 13. As a result, a portion of the path of light from the light source 11 is blocked by the light shielding section 13, and the path of the light is changed.

A position where the light shielding section 13 blocks the path of the light L may be a position of the aperture of the diaphragm of the light collecting section 12 being a lens, and may be an incident portion or an exit portion of the light in the light collecting section 12. As a method in which the light shielding section 13 blocks the path of the light L, the diaphragm of the light collecting section 12 may be used, or a light shielding plate or a film provided with an opening may be used. In the example in FIG. 1A, the light L emitted from the light source 11 is collected by the light collecting section 12 and is emitted toward the object X. At this time, by controlling the light shielding section 13, the optical path control section 19 illuminates the light L in an illumination direction D1 to the object X or illuminates the object X in an illumination direction D2. Incidentally, in FIG. 1A, two lights L are illustrated; however, this example does not depict a state in which these two lights L are passing through the light collecting section 12 at the same time, but schematically depicts a state in which the light shielding section 13 movable in a plane perpendicular to an optical axis allows the light L pass through at different positions.

Figure 1B:
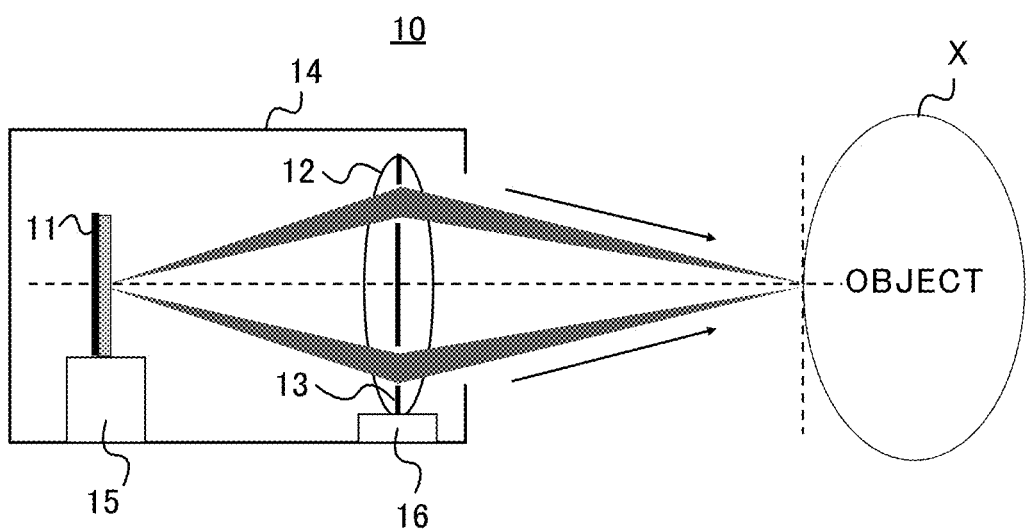

FIG. 1B illustrates a state in which the optical control apparatus 10 is accommodated in a housing. The light source 11 and the light collecting section 12 of the optical control apparatus 10 are fixed inside the housing 14. In an example in FIG. 1B, the light source 11 is fixed to the housing 14 by a support section 15, and the light collecting section 12 is fixed to the housing 14 by a support section 16. The light collecting section 12 and the light shielding section 13 are fixedly disposed, and a relative position with respect to the light source 11 is fixed. As described above, the optical control apparatus 10 changes an illumination direction of light illuminated toward the object X, by changing the path through which the light L passes by the optical path control function using the light shielding section 13. Therefore, since it is not necessary to change position of the light source 11 and the light collecting section 12, it is possible to fixedly dispose the light source 11 and the light collecting section 12 in the housing 14 or the like as depicted in FIG. 1A, and to minimize the entire apparatus. In the above example, although the light collecting section 12 and the light shielding section 13 are fixedly disposed, in a case where the light shielding section 13 controlled by the optical path control function is formed to change a passing position of the light in the plane perpendicular to the optical axis of the light, the light collecting section 12 and the light shielding section 13 may not be fixedly disposed.

Figure 2:
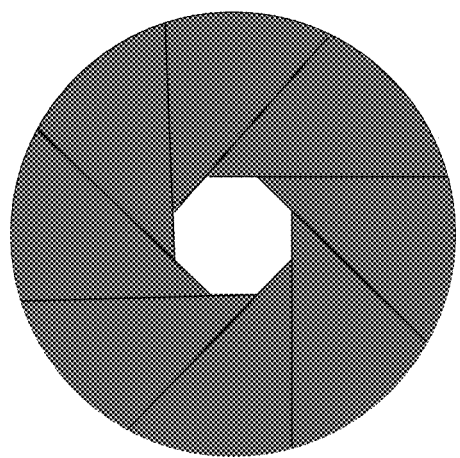
FIG. 2 illustrates an example of a light shielding section.

Next, a method for changing the illumination direction by the light shielding section 13 blocking the path of the light will be specifically described. In the following example, the lens is used as the light collecting section 12, using the diaphragm of the lens as the light shielding section 13. FIG. 2 illustrates a shape of the diaphragm in a case of reducing the diaphragm of a general lens. In a case of using a general lens as the light collecting section 12 and blocking the path of the light by using the diaphragm of the lens as a light shielding section 13a, the illumination direction of the light toward the object X, that is, a virtual light source direction viewed from the object X corresponds to a center direction of the lens, as depicted by an arrow D3 in FIG. 3, and the light is illuminated from a center of the lens toward the object X.

Figure 3:
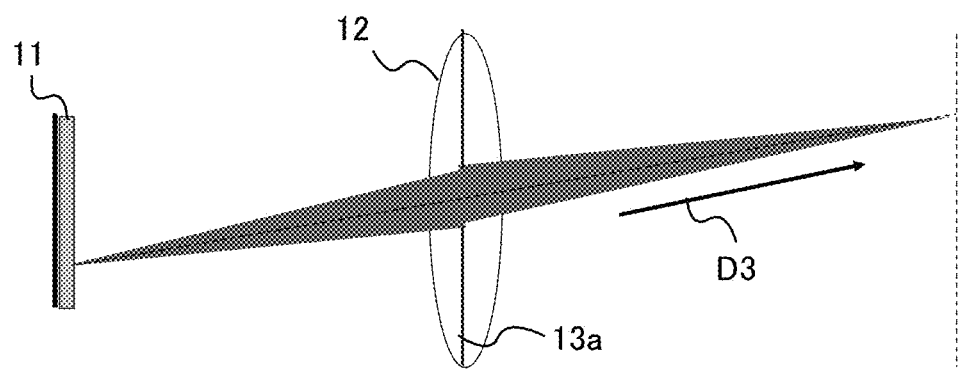
FIG. 3 illustrates an illumination direction of light due to the light shielding section depicted in FIG. 2.
Figure 4:
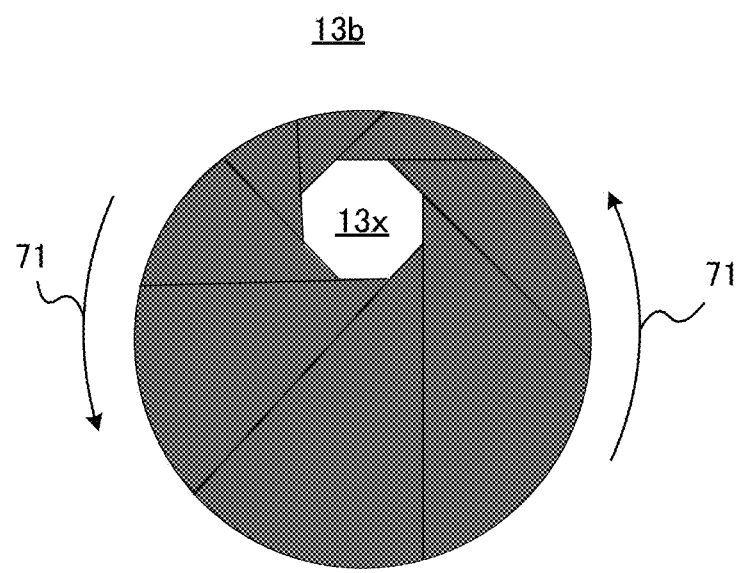
FIG. 4 illustrates another example of the light shielding section.
Figure 5:
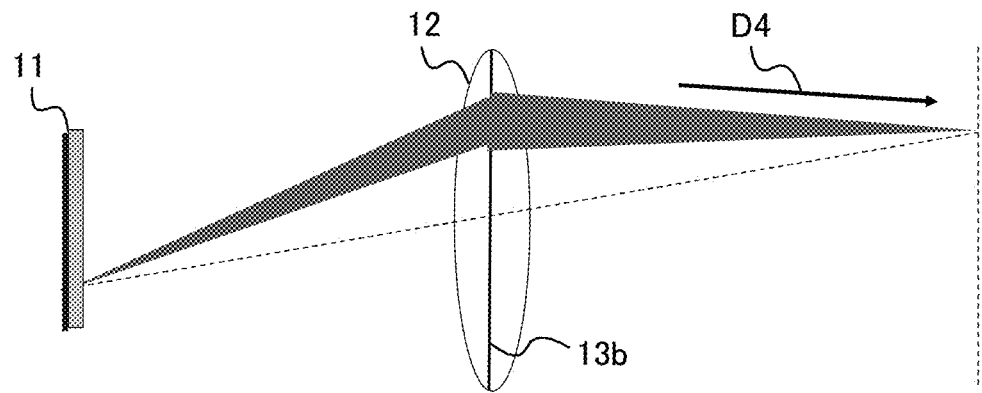
FIG. 5 illustrates an illumination direction of light due to the light shielding section depicted in FIG. 3.

On the other hand, in a case of blocking the path of the light using the diaphragm of the lens as depicted in FIG. 4 as the light shielding section 13b, the virtual light source direction corresponds to an upper side of the lens than the case in FIG. 3, the light is illuminated from a top of the lens toward the object X as depicted by an arrow D4 in FIG. 5. Accordingly, by controlling the diaphragm of the lens as the light shielding section 13b, it is possible to change the direction of the light illuminated toward the object X, that is, the virtual light source direction. Moreover, using the diaphragm of the lens as depicted in FIG. 4 as the light shielding section 13b and forming the lens to be rotatable in a circumferential direction as indicated by arrows 71 in FIG. 4, it is possible to arrange an opening 13x formed by the diaphragm at any position in the circumferential direction of the lens. By this arrangement, it is possible to illuminate the light toward the object X from a direction shifted vertically and horizontally with respect to an optical axis direction passing through the center of the lens and leading to the object X. Note that as a function of rotating the lens in the circumferential direction, for instance, the support section 16 depicted in FIG. 1B may be formed to rotatably support the lens corresponding to the light collecting section 12, around the central axis of the lens. As described above, in a case of using the lens as the light collecting section 12 and using the diaphragm as the light shielding section 13, it is possible to change a position of a portion of the light passing through the light collecting section 12 by adjusting a position of the aperture of the diaphragm of the lens. Moreover, by adjusting a state of the diaphragm of the lens, that is, a shape of the opening 13x, it is possible to change the shape of the light passing through the light collecting section 12.

As the light shielding section 13, other than using the diaphragm of the lens as described above, it is possible to use a light shielding plate or a film provided with an opening. In this case, by changing a position of the opening by moving the light shielding plate provided with the opening or the film, it is possible to change the position to pass light. For instance, similarly to the example of the diaphragm depicted in FIG. 4, an opening is provided at a part of the light shielding plate or the film of a disc shape, in a case where the light shielding plate or the film is rotated in a circumferential direction, a position of the opening, that is, a position for passing light is moved in the circumferential direction with respect to an optical axis. By this configuration, it is possible to change an illumination direction of the light with respect to the object X.

Also, as the light shielding section 13, it is possible to use a liquid crystal (Liquid Crystal Display) element or a digital micro-mirror device. In this case, the liquid crystal element or the digital micro-mirror device controls a path through which the light passes by changing a polarization direction or a path of the light emitted from the light source 11. By this control, it is possible to change the illumination direction of the light with respect to the object X.

Figure 6:
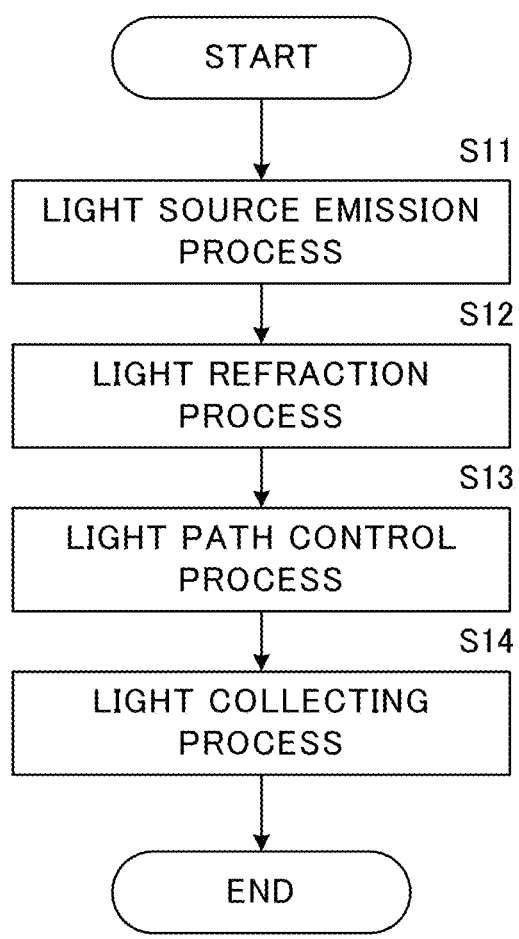
FIG. 6 is a flowchart illustrating an operation of the optical control apparatus.

FIG. 6 is a flowchart illustrating an operation of the optical control apparatus 10 of the first example embodiment. First, as a light source emission process, the optical control apparatus 10 causes the light source 11 to emit light and the light to enter the light collecting section 12 (step S11). Next, as a light refraction process, the light collecting section 12 causes the light incident on the light collecting section 12 from the light source 11 to refract toward the light shielding section 13 (step S12).

Next, as an optical path control process, specifically, the light shielding section 13 provided in the light collecting section 12 blocks light passing through a specific path among light incident on the light shielding section 13, by changing the position and the shape of the aperture of the diaphragm provided on the lens (step S13). Light that has not been blocked passes through the light collecting section 12 as it is. Incidentally, for convenience of explanation here, an example in which the diaphragm of the lens is used as the light shielding section 13 is illustrated; instead, the light shielding plate or the film provided with an opening, the liquid crystal element, the digital micro-mirror device or the like may be used as the light shielding section 13.

Next, as a light collecting process, the light collecting section 12 collects light that has passed through the path without being blocked by the light shielding section 13 on a focal plane of the light collecting section 12 and illuminates the object X (step S14). Accordingly, in a direction toward the object X from a position where the light shielding section 13 causes the light to pass through, light is emitted to the object X.

According to the optical control apparatus 10 described above, without physically changing the position of the light source, it is possible to virtually change a light source position by controlling a path of light in the lens for condensing light by the optical path control function. By this control, it is not necessary to install a plurality of illuminations in order to avoid an influence in that illumination light is directly reflected at an object surface, and it is possible to minimize a photographing apparatus using the optical control apparatus as illumination. In addition, even in a case where it is necessary to photograph by exposing light from different light source directions to a subject, such as an illuminance difference stereo method, light can be illuminated from different directions to the subject using a single light source without changing the position of the light source, and the photographing apparatus can be miniaturized.

(First Modification of the Optical Control Apparatus)

Figure 7:
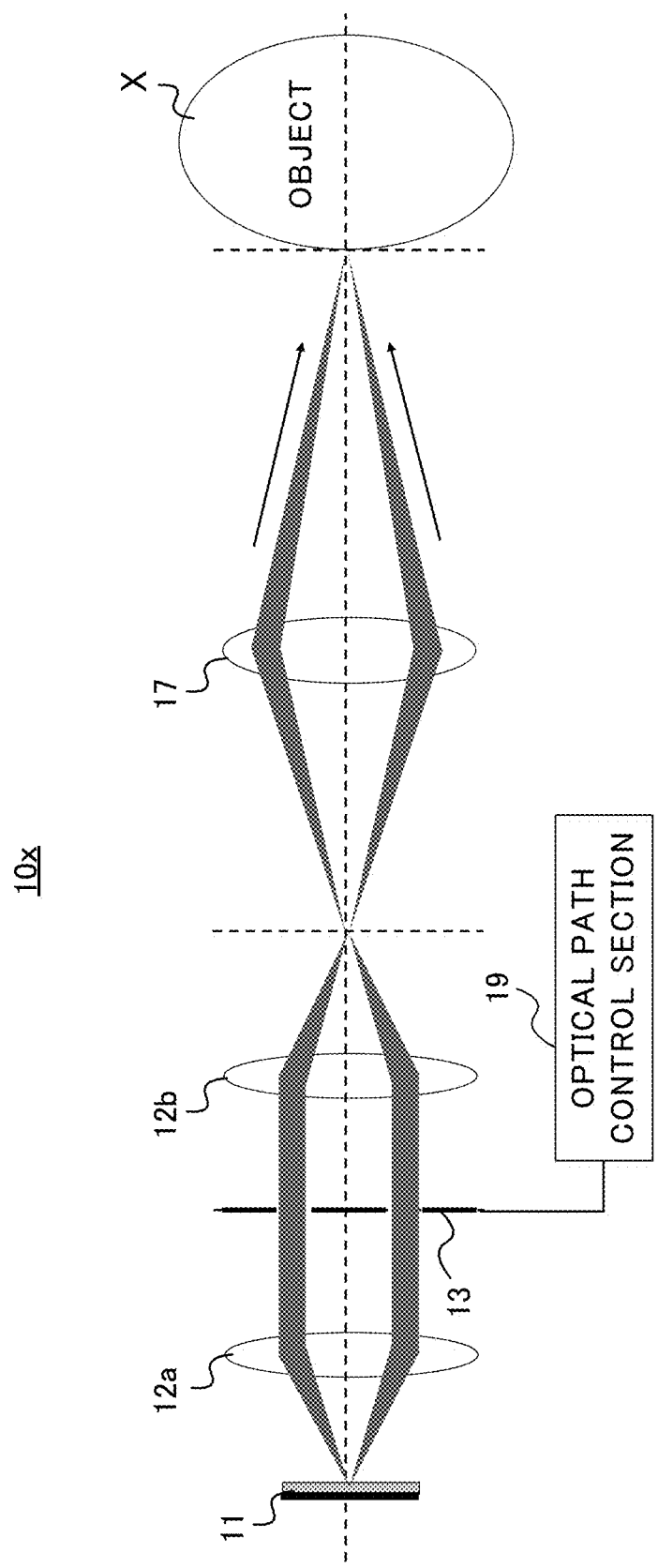
FIG. 7 illustrates a configuration of a first modification of the optical control apparatus.

FIG. 7 illustrates a configuration of a first modification of the optical control apparatus. In an optical control apparatus 10x according to the first modification, the light collecting section 12 is formed by two lenses 12a and 12b, and the light shielding section 13 is provided therebetween. As the light shielding section 13, as described above, it is possible to use the light shielding plate, the film, the liquid crystal element, the digital micro-mirror device, or the like provided with the opening. Moreover, the optical control apparatus 10x is formed so that an optical path of light illuminated onto the object X is extended by providing a relay lens 17 in a latter stage of the light collecting section 12.

(Second Modification of the Optical Control Apparatus)

Figure 8:
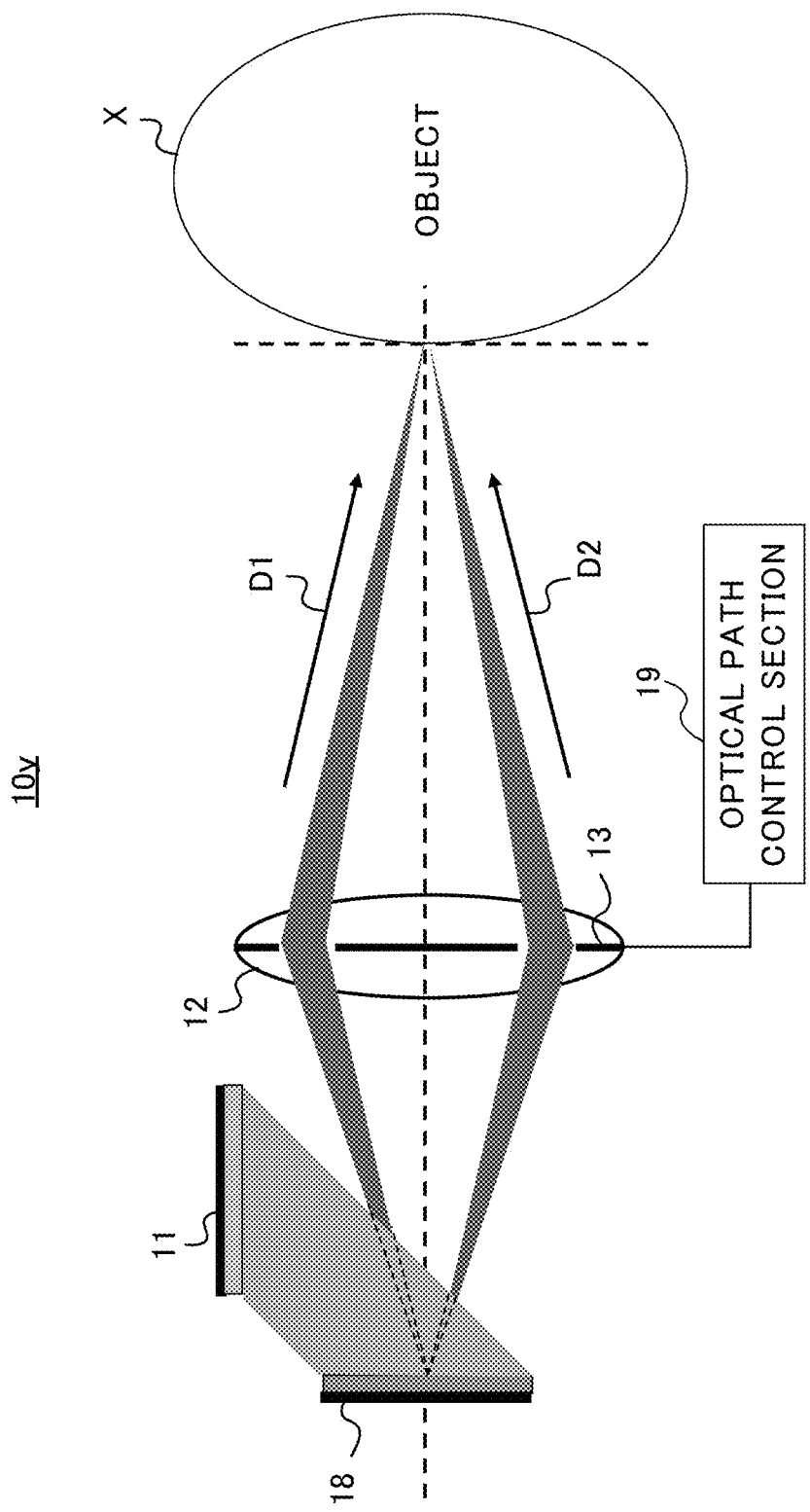
FIG. 8 illustrates a configuration of a second modification of the optical control apparatus.

FIG. 8 illustrates a configuration of a second modification of the optical control apparatus. An optical control apparatus 10y according to the second modification includes a light reflection section 18 in addition to the configuration of the optical control apparatus 10 depicted in FIG. 1A. Incidentally, in the optical control apparatus 10y, a configuration other than the light reflection section 18 is the same as that of the optical control apparatus 10 depicted in FIG. 1A.

The light reflection section 18 reflects light emitted by the light source 11 toward the light collecting section 12. The light reflection section 18 is formed by a mirror or a digital micro-mirror device, or a combination thereof. By using the digital micro-mirror device, even in a case where the light source 11 itself is unable to emit light having a spatial pattern, it is possible to reflect the light having a spatial pattern by the light reflection section 18, and it is possible to emit light having a spatial pattern with respect to the object X. Note that a reflection method of light by the light reflection section 18 is not particularly limited, and may be to reflect the light by a flat surface or by a curved surface. As a specific example, the light reflection section 18 may reflect light so that reflected light is parallel light. Incidentally, in FIG. 8, although the light collecting section 12 and the light shielding section 13 are integral, the light shielding section 13 may be independent of the light collecting section 12. Specifically, as viewed from the object X, the light shielding section 13 may be disposed on either one of a rear and a front of the light collecting section 12.

Figure 9:
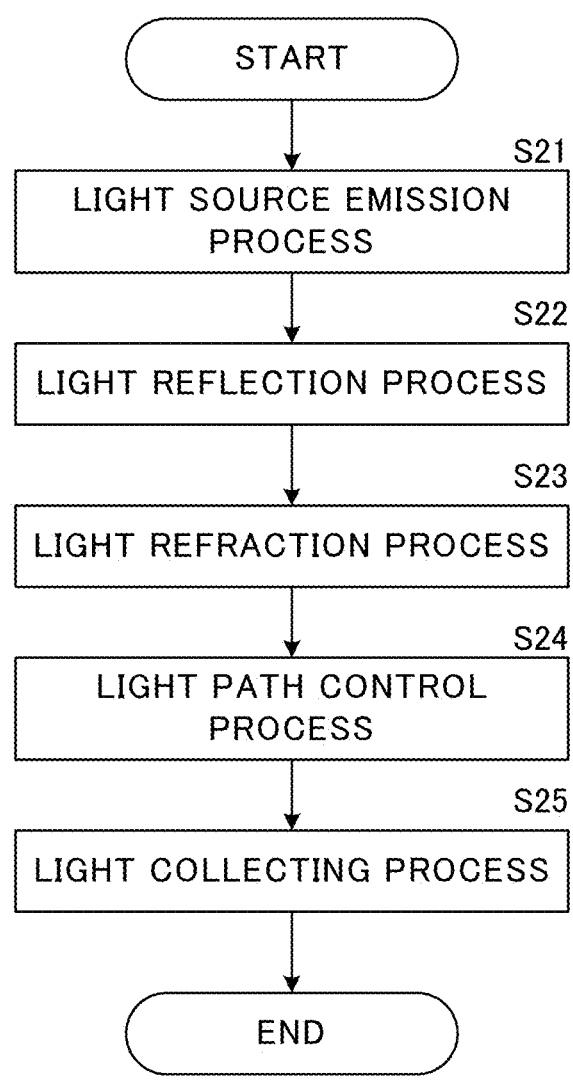
FIG. 9 is a flowchart of an operation of an optical control apparatus according to the second modification.

FIG. 9 is a flowchart of an operation of the optical control apparatus 10y according to the second modification. First, as a light source emission process, the optical control apparatus 10y causes light source 11 to emit light and the light to be incident on the light reflection section 18 (step S21). As a light reflection process, the light reflection section 18 reflects the light emitted from the light source 11, and causes the light incident on the light collecting section 12 (step S22). Next, as a light refraction process, the light collecting section 12 causes the light incident on the light collection section 12 from the light reflection section 18 to refract toward the light shielding section 13 (step S23).

Next, as the optical path control process, light passing through a specific path is blocked, among light incident on the light shielding section 13 by changing a position and a shape of the aperture of the diaphragm as the light shielding section 13 provided in the light collecting section 12 (step S24). Light for which a path is not blocked by the light shielding section 13 passes through the light collecting section 12 as it is. Then, as the light collecting process, the light collecting section 12 collects, on a focal surface of the light collecting section 12, the light passing through without being blocked by the light shielding section 13, and causes the light to illuminate the object X (step S25). By these processes, in a direction toward the object X from a position where the light shielding section 13 transmits light, the light is applied onto the object X.

Second Example Embodiment

Figure 10:
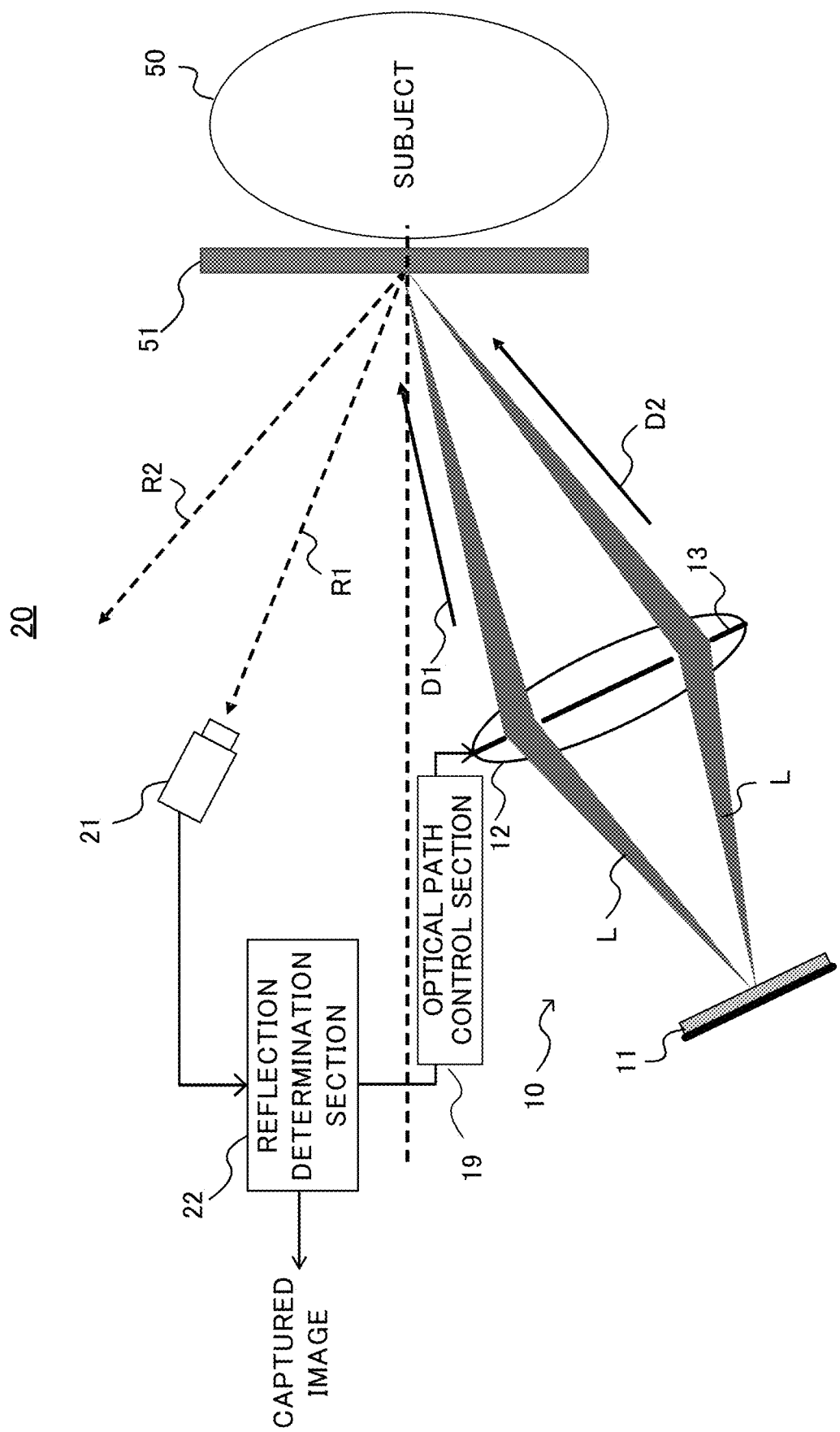
FIG. 10 illustrates a configuration of a photographing apparatus applying the optical control apparatus.

Next, a second example embodiment, to which the optical control apparatus of the first example embodiment is applied, will be described. In the second example embodiment, the optical control apparatus is applied to a photographing apparatus for photographing a subject. FIG. 10 illustrates a configuration of the photographing apparatus to which the optical control apparatus 10 of the first example embodiment is applied. A photographing apparatus 20 includes an image pickup apparatus 21, and a reflection determination section 22 in addition to the optical control apparatus 10. In a case of photographing a subject 50 through a translucent reflective object 51, it is possible for the photographing apparatus 20 to prevent saturation of pixel values of a captured image due to the light from the light source 11 which is reflected from the translucent reflective object 51.

Figure 11:
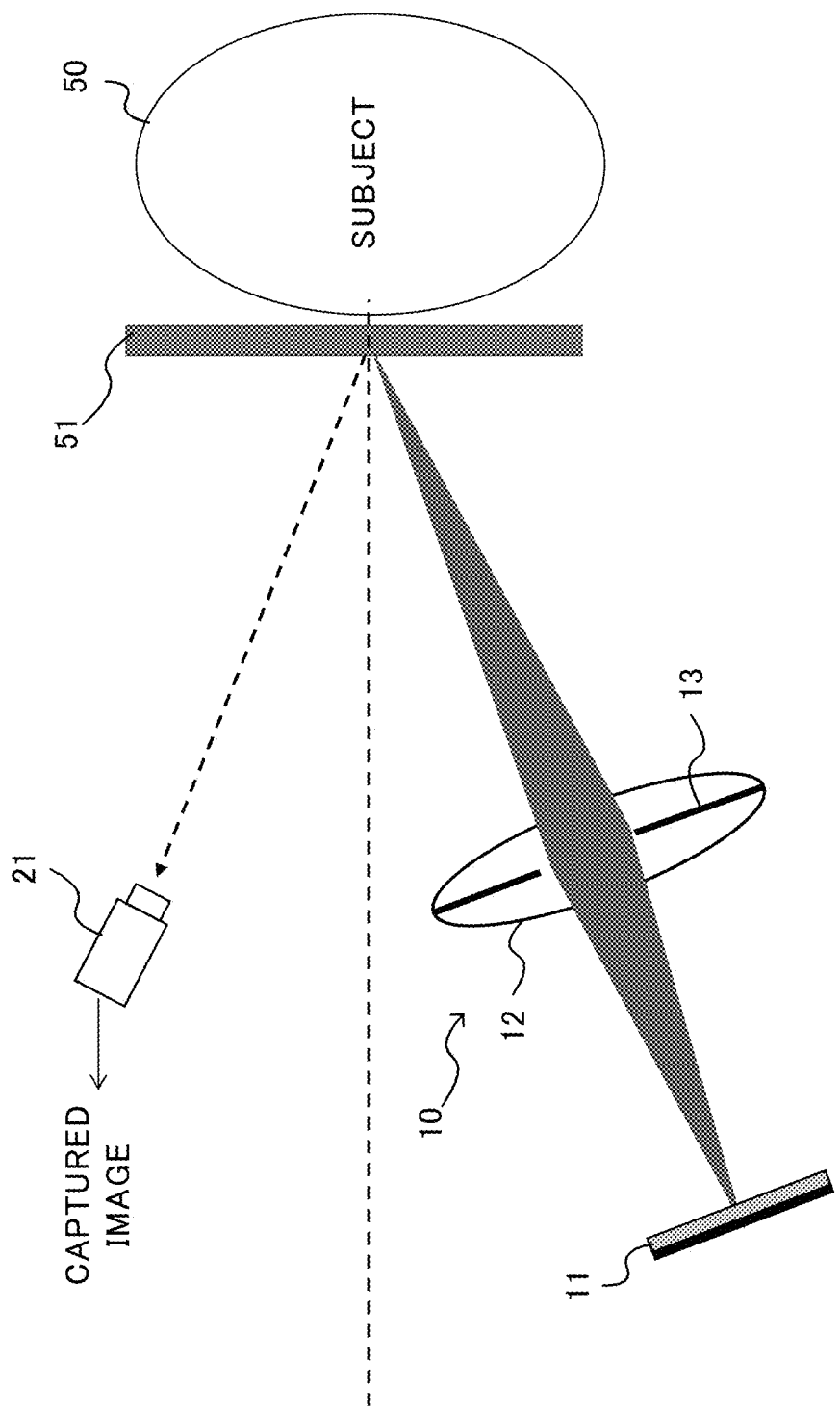
FIG. 11 illustrates an example in which a reflected light is directly incident on the image pickup apparatus.

In general, in a case of photographing the subject 50 through the translucent reflective object 51 such as glass in which light is partially transmitted, a part of light emitted from the light source 11 is reflected off a surface of the translucent reflective object 51. In this specification, an object such as the glass which transmits a part of light and reflects another part is called a "translucent reflective object". As illustrated in FIG. 11, in a case where the image pickup apparatus 21 exists ahead of the light reflected from the translucent reflective object 51, the reflected light is incident directly on the image pickup apparatus 21, and brightness values in an area of the reflected light in the captured image are saturated (also referred to as "overexposure"). Accordingly, in the second example embodiment, an illumination direction of light emitted toward the translucent reflective object 51 is changed by the light shielding section 13, and light reflected from the translucent reflective object 51 is thus prevented from being incident directly on the image pickup apparatus 21. Accordingly, in an image captured by the image pickup apparatus 21, it is possible to prevent an occurrence of an overexposure due to direct incident of the reflected light.

In FIG. 10, in a case where the optical control apparatus 10 emits the light L to the subject 50 along the illumination direction D1, the light L is reflected by the translucent reflective object 51, and the reflected light is directly incident on the image pickup apparatus 21 through a path R1. On the other hand, in a case where the optical control apparatus 10 illuminates the light L to the subject 50 along an illumination direction D2, the light L is reflected on the translucent reflective object 51; however, the reflected light does not enter directly to the image pickup apparatus 21 because of passing through the path R2. Therefore, the optical control apparatus 10 controls the optical path control section 19 so that the reflected light does not enter directly into the image pickup apparatus 21.

Specifically, the photographing apparatus 20 operates as follows. The optical control apparatus 10 collects light emitted from the light source 11 by the light collecting section 12, and emits the light to the subject 50. The image pickup apparatus 21 captures an image of the subject 50 through the translucent reflective object 51, and outputs the captured image to the reflection determination section 22. With respect to the captured image being input, the reflection determination section 22 determines whether an overexposure due to reflection of light from the light source is occurred. For instance, the reflection determination section 22 compares a brightness value of each pixel of the captured image with a predetermined threshold value, and determines that the overexposure is occurred in the pixel where the brightness value is equal to or greater than the predetermined threshold value. In a case where no overexposure occurs, the reflection determination section 22 outputs the captured image to an outside.

On the other hand, in a case where the overexposure is occurred in the captured image, the reflection determination section 22 controls the optical path control section 19 so as to change a path of the light from the light source. For instance, in a case where the light shielding section 13 corresponds to a diaphragm of a lens as described above, the optical path control section 19 controls the light shielding section 13 so that a position of the aperture of the diaphragm of the lens is changed. By these operations, for the light emitted from the optical control apparatus 10, the illumination direction to the subject 50 is changed. As described above, in a case where the reflection determination section 22 determines that the overexposure is occurred in the captured image, by changing the illumination direction of the light with respect to the subject, it is possible to obtain a captured image without an overexposure.

In an example of FIG. 10, as described above, in a case where the optical control apparatus 10 emits the light L along the illumination direction D1, the reflected light by the translucent reflective object 51 is incident directly on the image pickup apparatus 21. Accordingly, in a case where it is determined that the overexposure is occurred in the captured image input from the image pickup apparatus 21, the reflection determination section 22 instructs the optical control apparatus 10 to change a path of the light. The optical control apparatus 10 controls the optical path control section 19 so that the light L is emitted along the illumination direction D2. By this control, since the light reflected on the translucent reflective object 51 is not incident directly on the image pickup apparatus 21, the overexposure does not occur in the image captured by the image pickup apparatus 21.

In general, in order to prevent an overexposure of a captured image under illumination by light from a light source, it is necessary to change a position of at least one of a light source and an image pickup apparatus so that reflected light is not directly incident on the image pickup apparatus. However, in a case of providing a mechanism for adjusting positions of the light source and the image pickup apparatus to the photographing apparatus, there is a disadvantage that a system becomes large. In contrast, in the photographing apparatus 20 of the second example embodiment, since a virtual position of the light source can be changed by changing an illumination direction of light with respect to a subject without physically moving the optical control apparatus 10 and the image pickup apparatus 21, and it is thus possible to reduce a size of the photographing apparatus.

In the example of the photographing apparatus 20 depicted in FIG. 10, the optical control apparatus 10 of the first example embodiment is used, but instead, the optical control apparatus 10x according to the first modification or the optical control apparatus 10y according to the second modification may be used.

Third Example Embodiment

Figure 12:
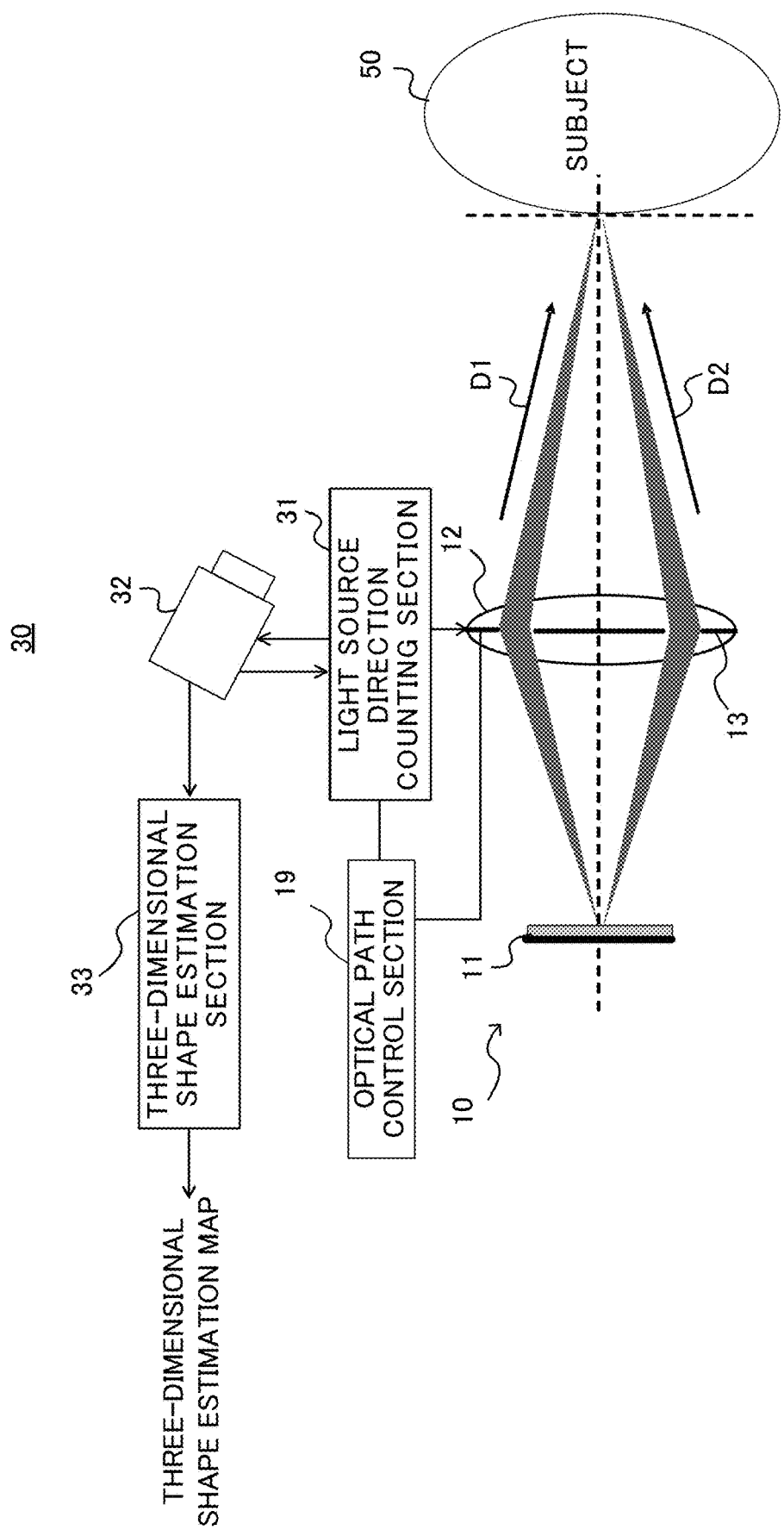
FIG. 12 illustrates a configuration of a three-dimensional shape estimation apparatus applying the optical control apparatus.

Next, a third example embodiment, to which the optical control apparatus of the first example embodiment is applied, will be described. The third example embodiment applies the optical control apparatus to a three-dimensional shape estimation apparatus that estimates a three-dimensional shape of a subject. FIG. 12 illustrates a configuration of the three-dimensional shape estimation apparatus applying the optical control apparatus 10 of the first example embodiment. The three-dimensional shape estimation apparatus 30 includes a light source direction counting section 31, an image pickup apparatus 32, and a three-dimensional shape estimation section 33 in addition to the optical control apparatus 10 of the first example embodiment.

A photometric stereo is known as a technique for estimating a three-dimensional shape of a subject by emitting light from multiple different directions to a subject and by using an image taken from a single viewpoint. In this technique, by photographing while changing a light source direction which illuminates a subject, it is possible to estimate a three-dimensional shape of the subject based on images taken from a single viewpoint. In the three-dimensional shape estimation apparatus 30 of the third example embodiment, by using the optical control apparatus 10 of the first example embodiment, it is possible to estimate the three-dimensional shape of the subject without changing positions of both an image pickup apparatus and a light source.

Referring to FIG. 12, an operation of the three-dimensional shape estimation apparatus 30 will be described. In FIG. 12, the image pickup apparatus 32 receives a count number of the light source directions from the light source direction counting section 31, and compares the count number of the light source directions with a predetermined number N. Here, the "light source direction" is an illumination direction of light illuminating the subject 50 by the optical control apparatus 10, and the "count number of the light source directions" refers to a number of different illumination directions. Also, the predetermined number "N" is the number of light source directions required to estimate the three-dimensional shape of the subject in the photometric stereo, and generally indicates three or more directions in a case where the light source direction is known, and indicates six or more in a case where the light source direction is unknown. However, the estimation method of the three-dimensional shape of the subject is not limited to a specific method in the photometric stereo. Along with this, the predetermined number N of the light source direction count also changes according to a three-dimensional shape estimation method.

When the count number of the light source direction is less than a predetermined number N, the image pickup apparatus 32 photographs the subject 50, stocks a captured image, and outputs a notification (hereinafter, also referred to as an "imaging completion notification") indicating that an image is taken to the light source direction counting section 31. Here, a stock method of the captured image is not limited to a specific method; for instance, a captured image may be stored in an external storage medium. On the other hand, when the count number of the light source directions is equal to or greater than a predetermined number N, since the necessary number of photographing has been completed, the image pickup apparatus 32 outputs all images previously taken to the three-dimensional shape estimation section 33.

The light source direction counting section 31 increments the count number of the light source directions by one each time the imaging completion notification is input from the image pickup apparatus 32 increases, and outputs the count number of the light source directions to the image pickup apparatus 32. Also, when the count number of the light source directions is less than a predetermined number N, the light source direction counting section 31 outputs an instruction for changing a path of light to the optical path control section 19 of the optical control apparatus 10. By this instruction, the optical path control section 19 changes an illumination direction of the light emitted to the subject by controlling the light shielding section 13, that is, the light source direction.

For instance, in a case where the predetermined number N is three for the count number of the light source directions, the light source direction counting section 31 performs photographing of the subject while changing the light source direction until the count number of the light source directions attains three. By changing the light source direction, the photographing is performed in a state where the light is emitted from three different light source directions with respect to the subject 50. Then, when captured images corresponding to the three different light source directions are obtained, the image pickup apparatus 32 supplies the captured images to the three-dimensional shape estimation section 33. The three-dimensional shape estimation section 33 estimates a three-dimensional shape of the subject 50 using the captured images, and outputs a three-dimensional shape estimation map.

Incidentally, a communication method between the light source direction counting section 31 and the image pickup apparatus 32 is not particularly limited. Moreover, a communication method between the light source direction counting section 31 and the optical path control section 19 is not particularly limited.

In the photometric stereo, a three-dimensional shape of a subject is estimated based on an image taken from a single viewpoint by photographing a subject while changing a direction of a light source illuminating the subject. In this case, since it is usually necessary to photograph the subject by changing the direction of the light source, a plurality of light sources needs to be used or a position of the light source needs to be physically changed. The use of the plurality of light sources and the change of the position of the light source cause an increase of a size of a photographing apparatus. In addition, in a case where the light source is physically moved, there is also a problem that a photographing time is lengthened by an amount of time required for movement. In this regard, in the three-dimensional shape estimation apparatus 30 of the third example embodiment, without physically moving the position of the light source, it is possible to emit light from a plurality of different directions to a subject using a single light source, and to estimate a three-dimensional shape of the subject based on a plurality of images of the subject taken from a single viewpoint.

In the example of the photographing apparatus 20 illustrated in FIG. 10, the optical control apparatus 10 of the first example embodiment is used, but instead, the optical control apparatus 10x according to the first modification or the optical control apparatus 10y according to the second modification may be used.

Fourth Example Embodiment

Figure 13:
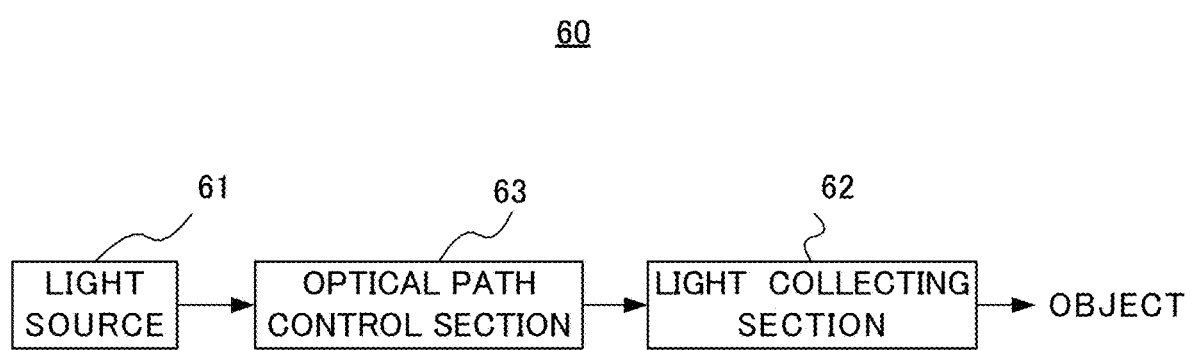
FIG. 13 illustrates a configuration of an optical control apparatus according to a fourth example embodiment.

Next, a fourth example embodiment of the present disclosure will be described. FIG. 13 illustrates a configuration of an optical control apparatus according to the fourth example embodiment. The optical control apparatus 60 includes a light source 61, a light collecting section 62, and an optical path control section 63. The light source 61 emits light. The light collecting section 62 collects light emitted from the light source and illuminates the light onto an object. The optical path control section 63 is disposed between the light source 61 and the light collecting section 62, and changes the illumination direction of the light with respect to the object by changing a position of a portion where the light passes in a plane perpendicular to an optical axis.

[Modification]

The light shielding section controlled by the optical path control section may be formed as the following modification.

(Modification 1)

Figure 14A:
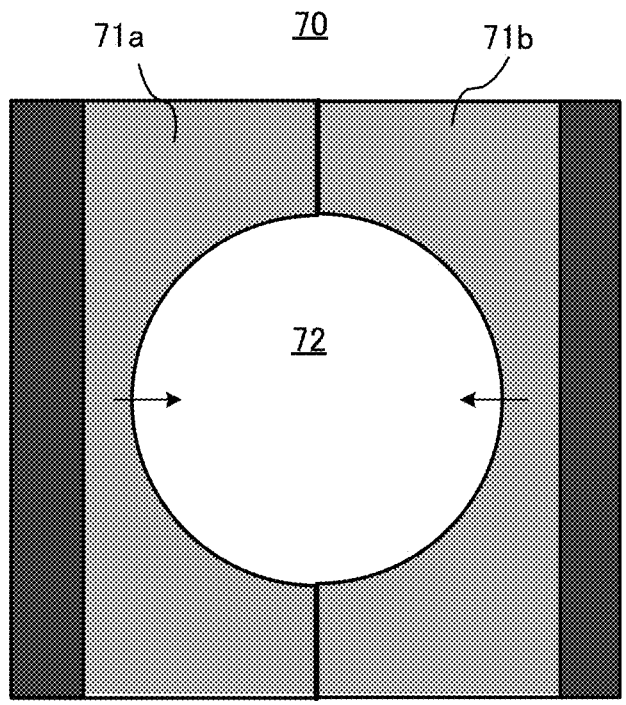
FIG. 14A and FIG. 14B illustrate a configuration of a light shielding section according to a modification 1.
Figure 14B:
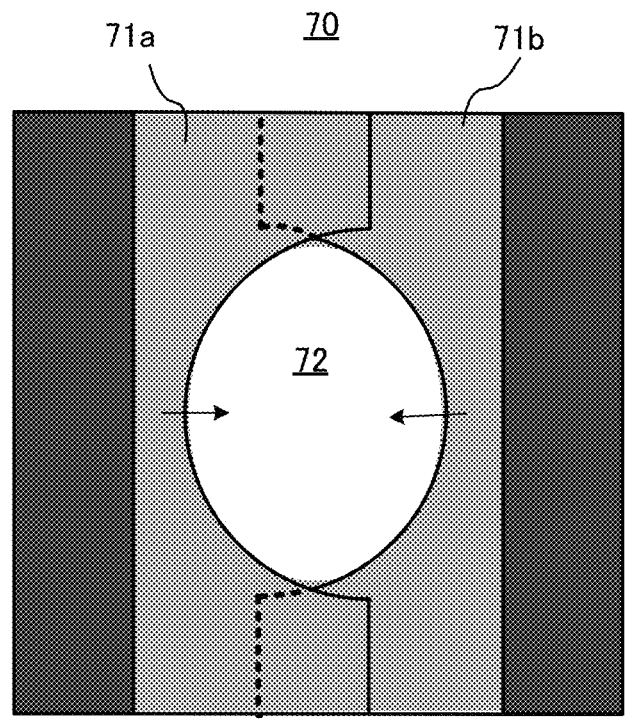

FIG. 14A and FIG. 14B illustrate configurations of a light shielding section 70 according to a modification 1. Incidentally, FIG. 14A and FIG. 14B are plan views of the light shielding section 70 from a light source side. The light shielding section 70 is formed by a pair of plates 71a and 71b that are chipped in a half-moon shape facing each other. The plates 71a and 71b are movable in a direction of an arrow, and the movement of the plates 71a and 71b is controlled by the optical path control section 19. FIG. 14A illustrates a state in which the plates 71a and 71b are not overlapped. An opening 72 through which the light passes is formed by chipped portions of the half-moon shapes of the plates 71a and 71b. FIG. 14B illustrates a state in which the plates 71a and 71b are moved respectively in the direction of the arrow. The plates 71a and 71b are moved in the direction of the arrow, so that the opening 72 is reduced and a region passing through the light shielding section 70 becomes smaller. In the examples of FIG. 14A and FIG. 14B, two plates 71a and 71b are arranged side by side in a lateral direction; however, these plates may be arranged in a vertical direction, and each may move in the vertical direction. Moreover, in the examples of FIG. 14A and FIG. 14B, the chipped portions of the half-moon shapes of the plates 71a and 71b are arranged to face to a center in the vertical direction; however, in a case where the chipped portions are arranged by shifting in the vertical direction, it is possible to shift a position where the light passes in the vertical direction.

(Modification 2)

Figure 15:
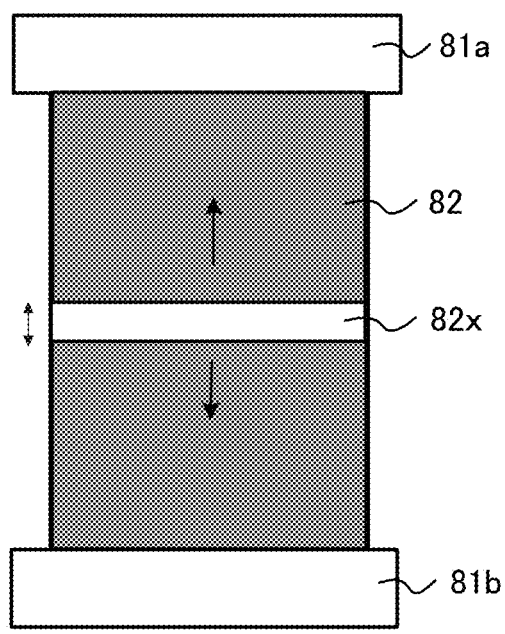
FIG. 15 illustrates a configuration of a light shielding section according to a modification 2.

FIG. 15 illustrates a configuration of a light shielding section 80 according to a modification 2. Incidentally, FIG. 15 is a plan view of the light shielding section 80 from a light source side. The light shielding section 80 corresponds to a roll-shaped member 82 provided with a slit 82x. By winding the roll-shaped member 82 with a pair of winding sections 81a and 81b, a position of the slit 82x moves and a portion through which light passes moves. Winding of the roll-shaped member 82 is controlled by the optical path control section 19. The roll-shaped member 82 is formed of paper, a film or the like. Note that the portion of the slit 82x may be an opening, a transparent film, or the like.

(Modification 3)

Figure 16:
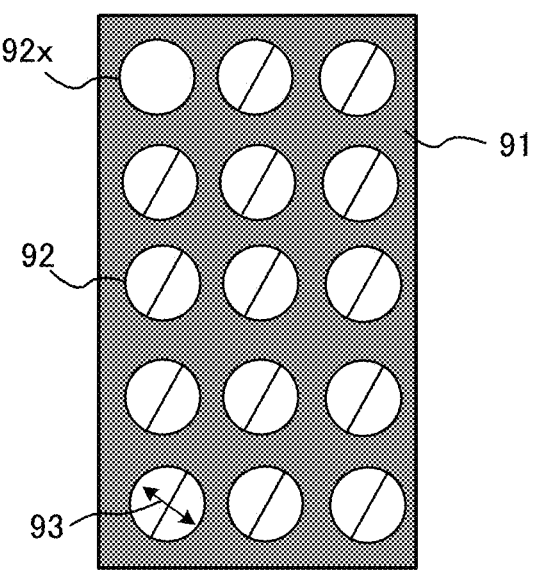
FIG. 16 illustrates a configuration of a light shielding section according to a modification 2.

FIG. 16 illustrates a configuration of the light shielding section 90 according to a modification 3. Incidentally, FIG. 16 is a plan view of a light shielding section 90 from a light source side. The light shielding section 90 forms a plurality of holes 92 in a plate-shaped member 91 and is formed by providing respective shutter mechanisms in portions of the holes 92. Each of shutter mechanism opens and closes in a direction of an arrow 93. Light passes through a position of one hole 92 where a shutter mechanism is open. In an example of FIG. 16, only the hole 92x is in an open state. By controlling the position of the hole 92 in an open state by the optical path control section 19, the position through which light passes is changed. Instead of the shutter mechanism, a light shielding section may be arranged on a back side of each of the holes 92 and the hole 92 may be opened and closed by moving a position of the light shielding section with respect to the hole 92.

A part or all of the example embodiments described above may also be described as the following supplementary notes, but not limited thereto.

Supplementary Note 1

1. An optical control apparatus comprising:
   a light source configured to emit light;
   a light collecting section configured to collect light emitted from the light source and illuminate the light onto an object; and
   an optical path control section configured to be arranged between the light source and the light collecting section, and change an illumination direction of the light onto the object by changing a position of a portion through which the light passes in a plane perpendicular to an optical axis of the light.

Supplementary Note 2

2. The optical control apparatus according to supplementary note 1, wherein the optical path control section changes a shape of the portion through which the light passes.

Supplementary Note 3

3. The optical control apparatus according to supplementary note 1 or 2, wherein the light collecting section is a lens and the optical path control section controls a diaphragm of the lens.

Supplementary Note 4

4. The optical control apparatus according to supplementary note 1 or 2, wherein the light collecting section is a lens and the optical path control section controls a liquid crystal element through which the light passes, or a micro-mirror device on which the light is reflected.

Supplementary Note 5

5. The optical control apparatus according to any one of supplementary notes 1 through 4, wherein the light source and the light collecting section are fixed inside a housing.

Supplementary Note 6

6. A photographing apparatus comprising:
an optical control apparatus according to any one of supplementary notes 1 through 5;
an image pickup apparatus configured to photograph the object; and
a determination section configured to change an illumination direction of the light by the optical path control section in a case of occurring saturation of pixel values in an image captured by the image pickup apparatus.

Supplementary Note 7

7. A three-dimensional shape estimation apparatus comprising:
an optical control apparatus according to any one of supplementary notes 1 through 5;
a counting section configured to count a number of different illumination directions of the light toward the object;
an image pickup apparatus configured to photograph the object while changing an illumination direction of the light until the number of different illumination directions attains a predetermined number; and
an inference section configured to acquire captured images corresponding to the predetermined number from the image pickup apparatus, and infer a three-dimensional shape of the object based on the captured images.

Supplementary Note 8

8. An optical control method comprising:
causing a light source to emit light; and
collecting the light and illuminating the light onto an object while changing an illumination direction with respect to the object by changing a position of a portion through which the light passes in a plane perpendicular to an optical axis of the light.

Supplementary Note 9

9. An optical control apparatus that is arranged between a light source and a light collecting section, and changes an illumination direction of light with respect to an object by changing a position of a portion through where the light passes in a plane perpendicular to an optical axis of the light.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS 10, 10x, 10y optical control apparatus
11 Light source
12 light collecting section
13 light shielding section
18 Light reflection section
19 Optical path control section
20 Photographing apparatus
21 Image pickup apparatus
22 Reflection determination section
30 Three-dimensional shape estimation apparatus
31 Light source direction counting section
32 Image pickup apparatus
33 Three-dimensional shape estimation section

What is claimed is:
1. An optical control apparatus comprising:
a lens comprising a pair of plates capable of blocking a portion of a path of light emitted from a light source and provided with chipped portions of a half-moon shape, and configured to collect light passing through an opening formed by said pair of plates and illuminate the light onto an object; and
a processor configured to change a light shading range of the light and an illumination direction of the light onto the object by moving the pair of plates so as to change a position of the opening in a plane perpendicular to an optical axis of the light.
2. The optical control apparatus according to claim 1, wherein the light source and the lens are fixed inside a housing.
3. The optical control apparatus according to claim 1, wherein the light source, the lens, and the processor are provided for the optical control apparatus.

* * * * *